W. A. CHAPMAN.
OPTICAL INSTRUMENT.
APPLICATION FILED JULY 31, 1911.
1,096,284.
Patented May 12, 1914.
7 SHEETS—SHEET 2.
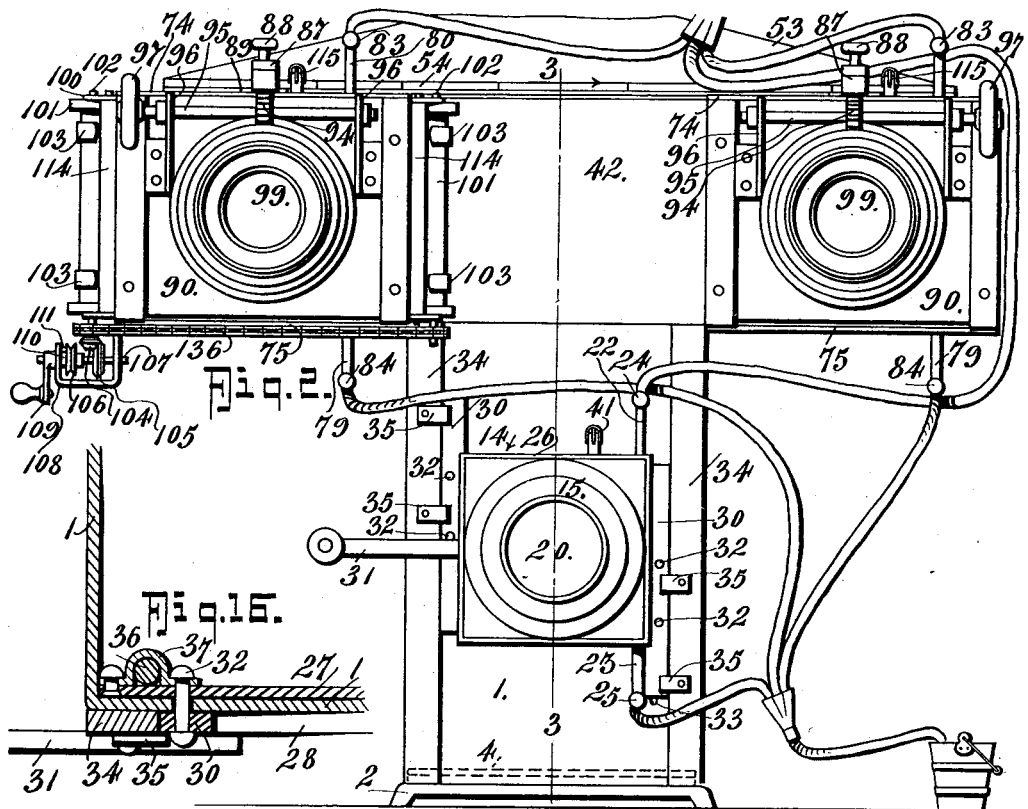
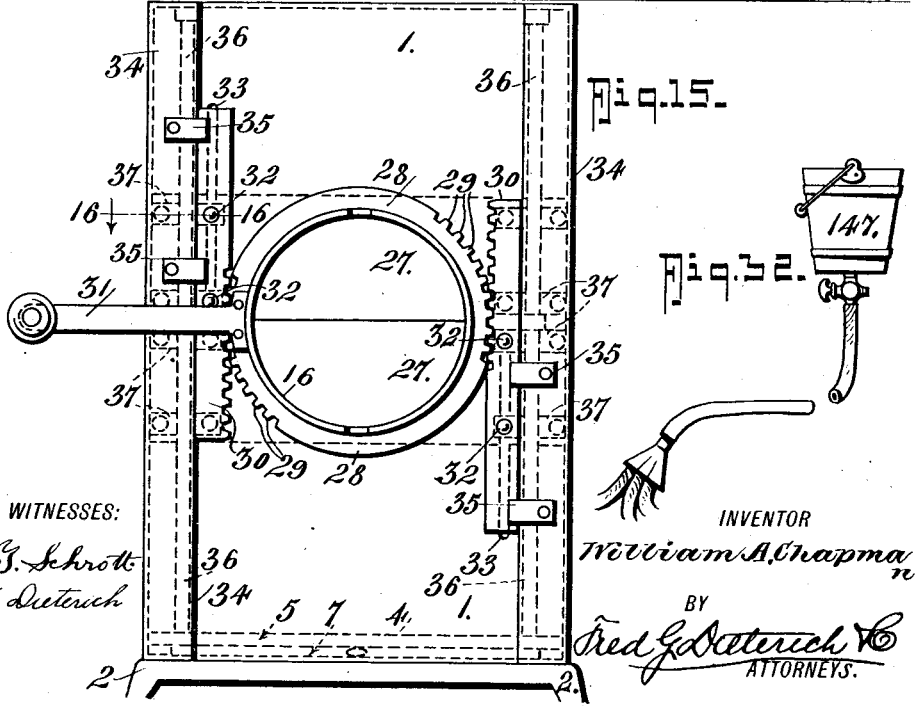
WITNESSES:
John J. Schrott
Louis F. Dieterich
INVENTOR
William A. Chapman
BY
Fred G. Dieterich
ATTORNEYS.

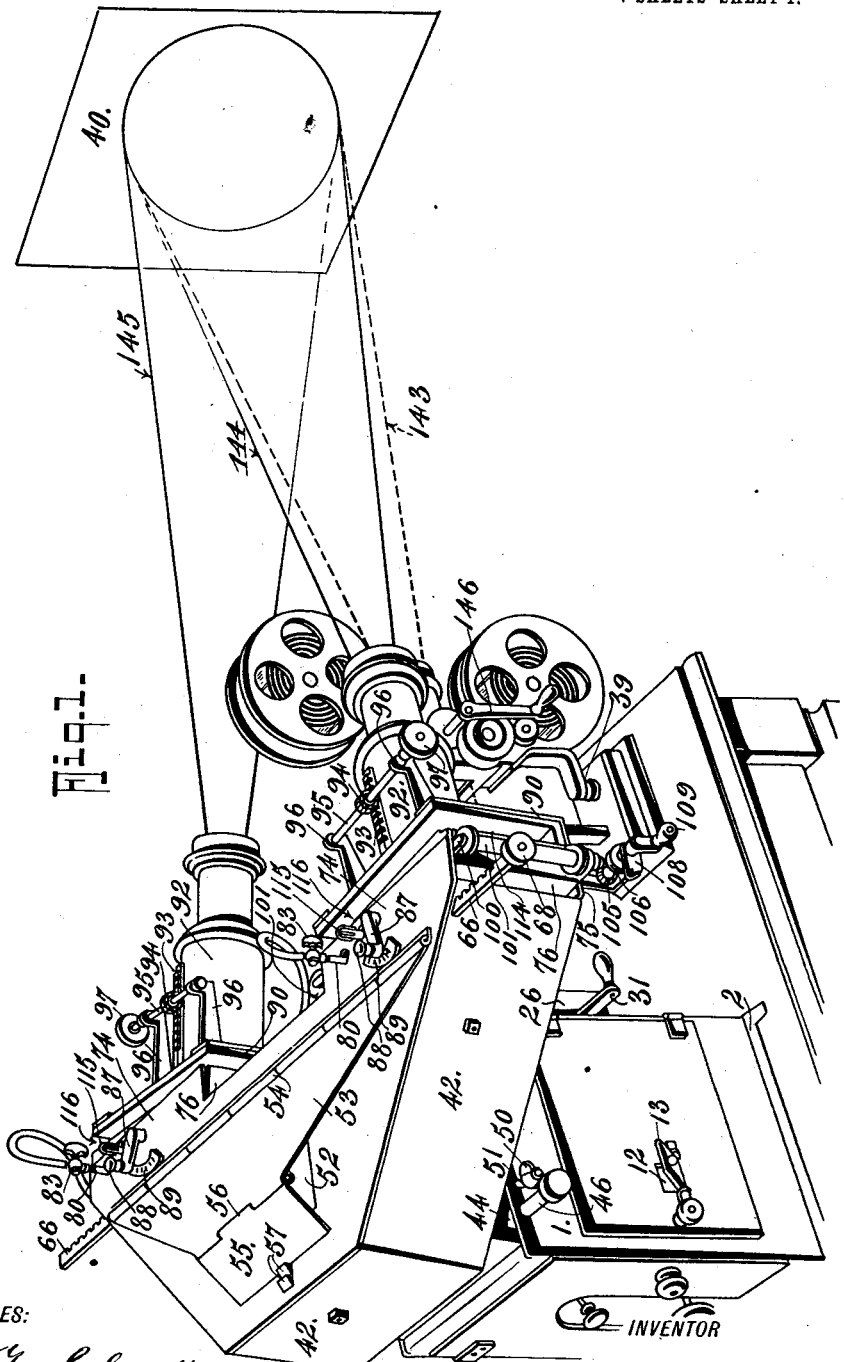

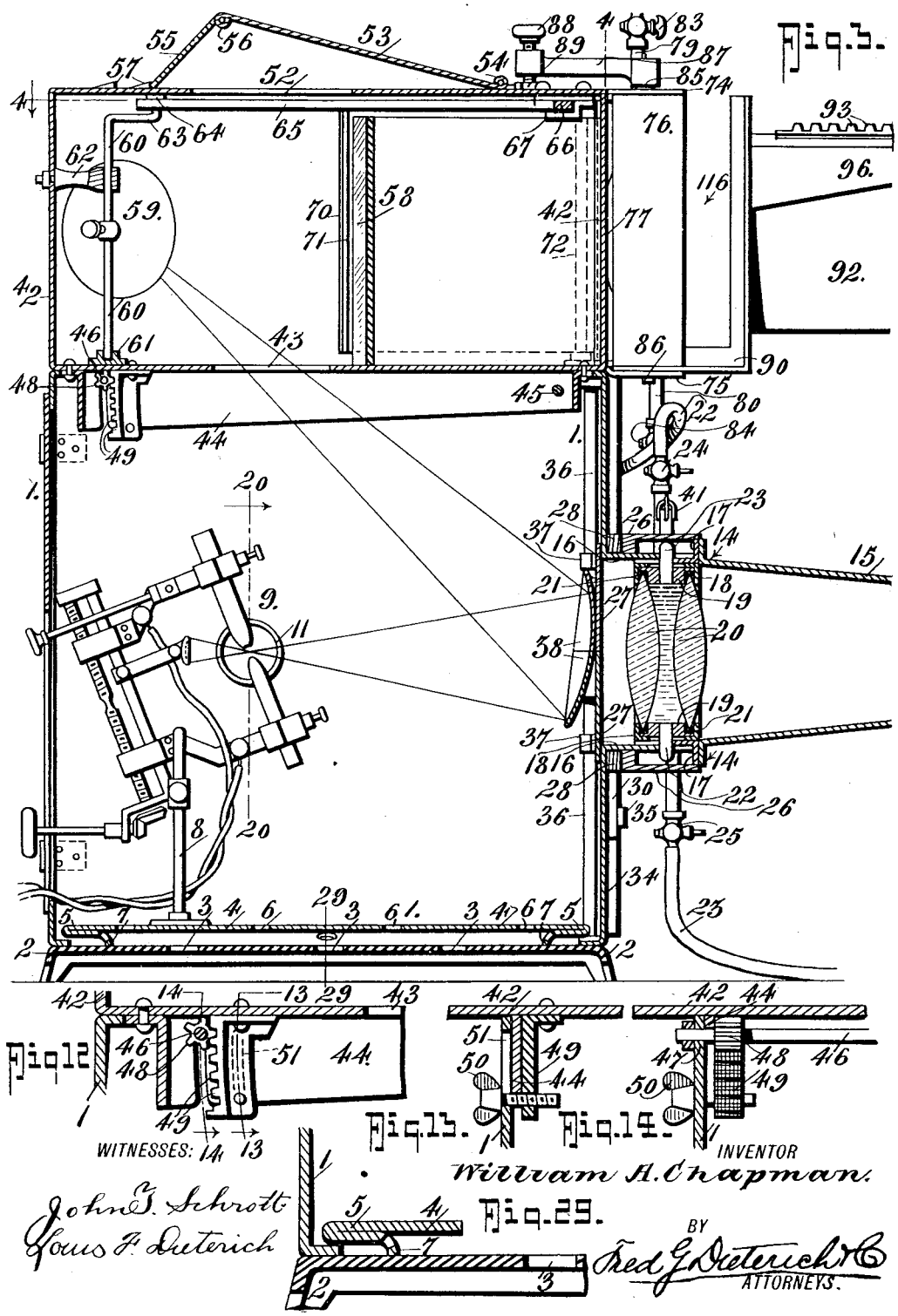

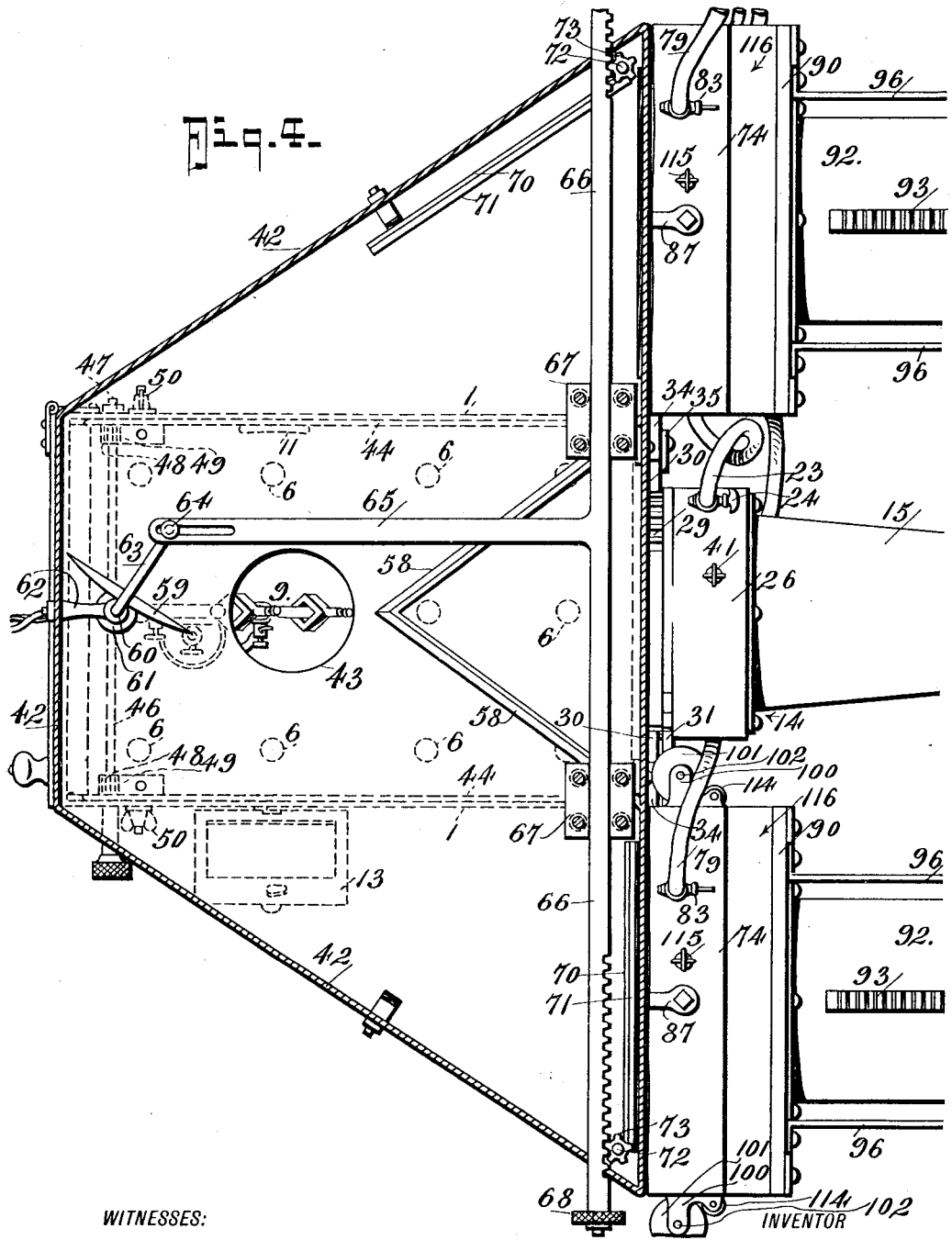

W. A. CHAPMAN.
OPTICAL INSTRUMENT.
APPLICATION FILED JULY 31, 1911.
1,096,284.
Patented May 12, 1914.
7 SHEETS—SHEET 5.
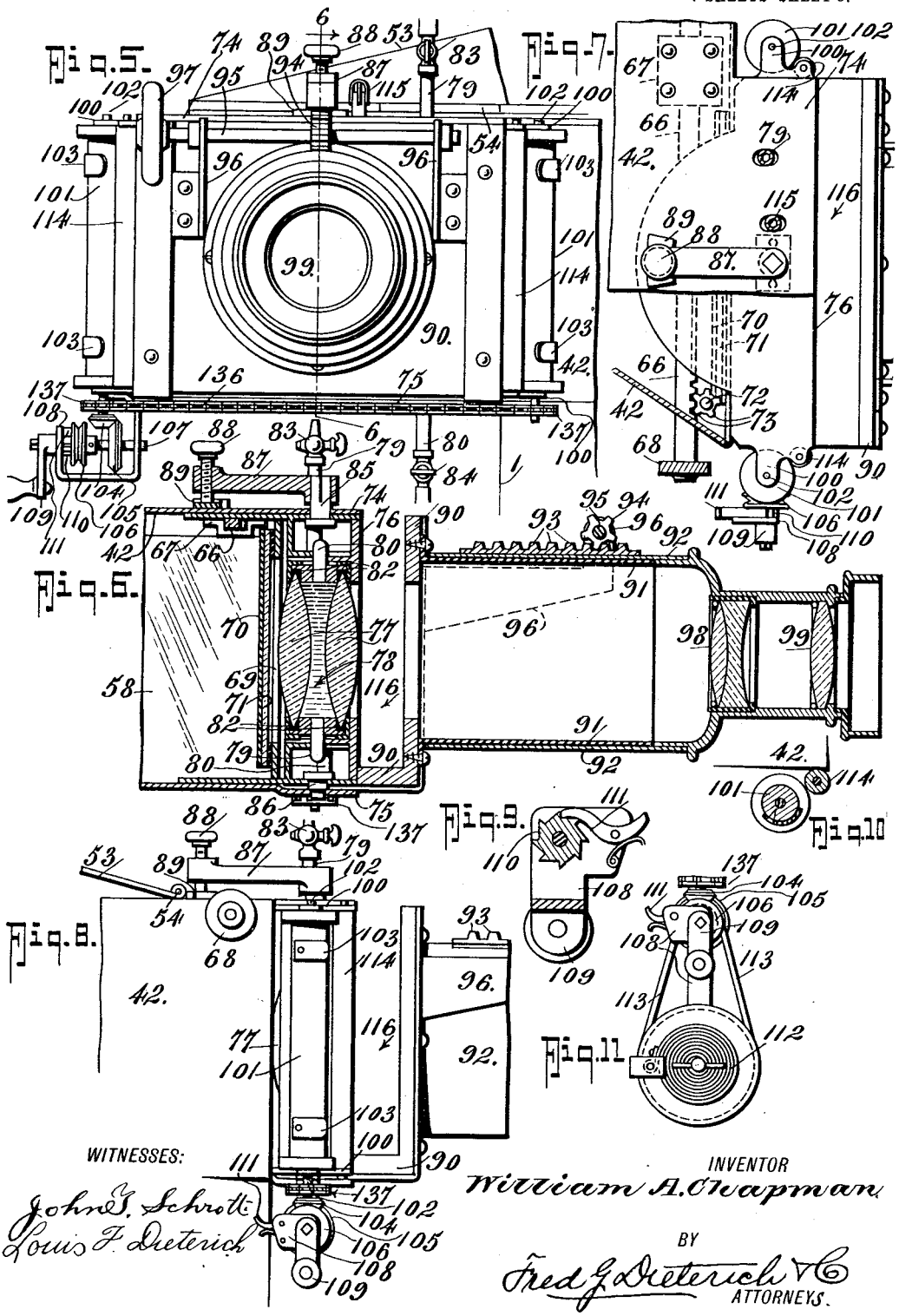

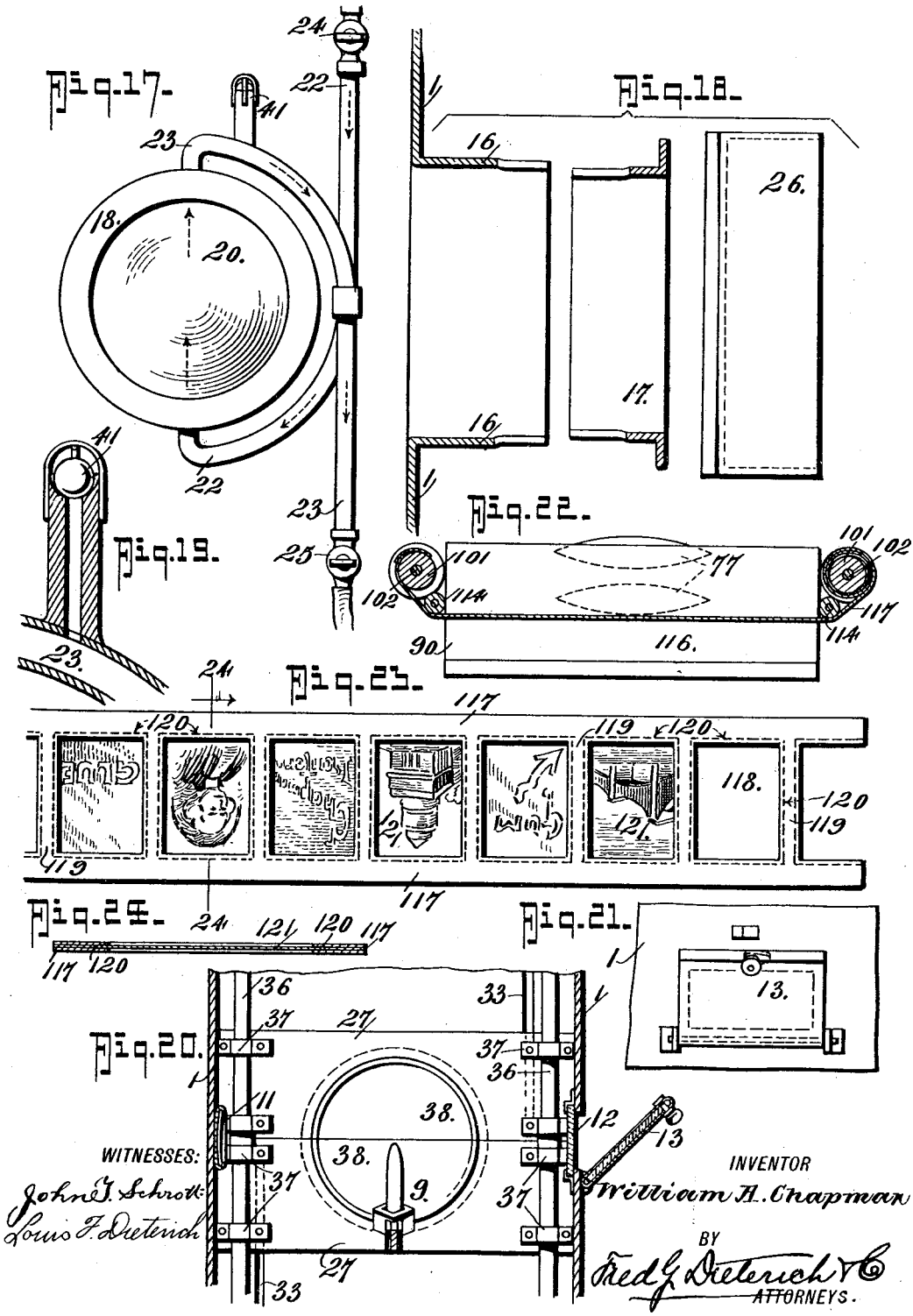

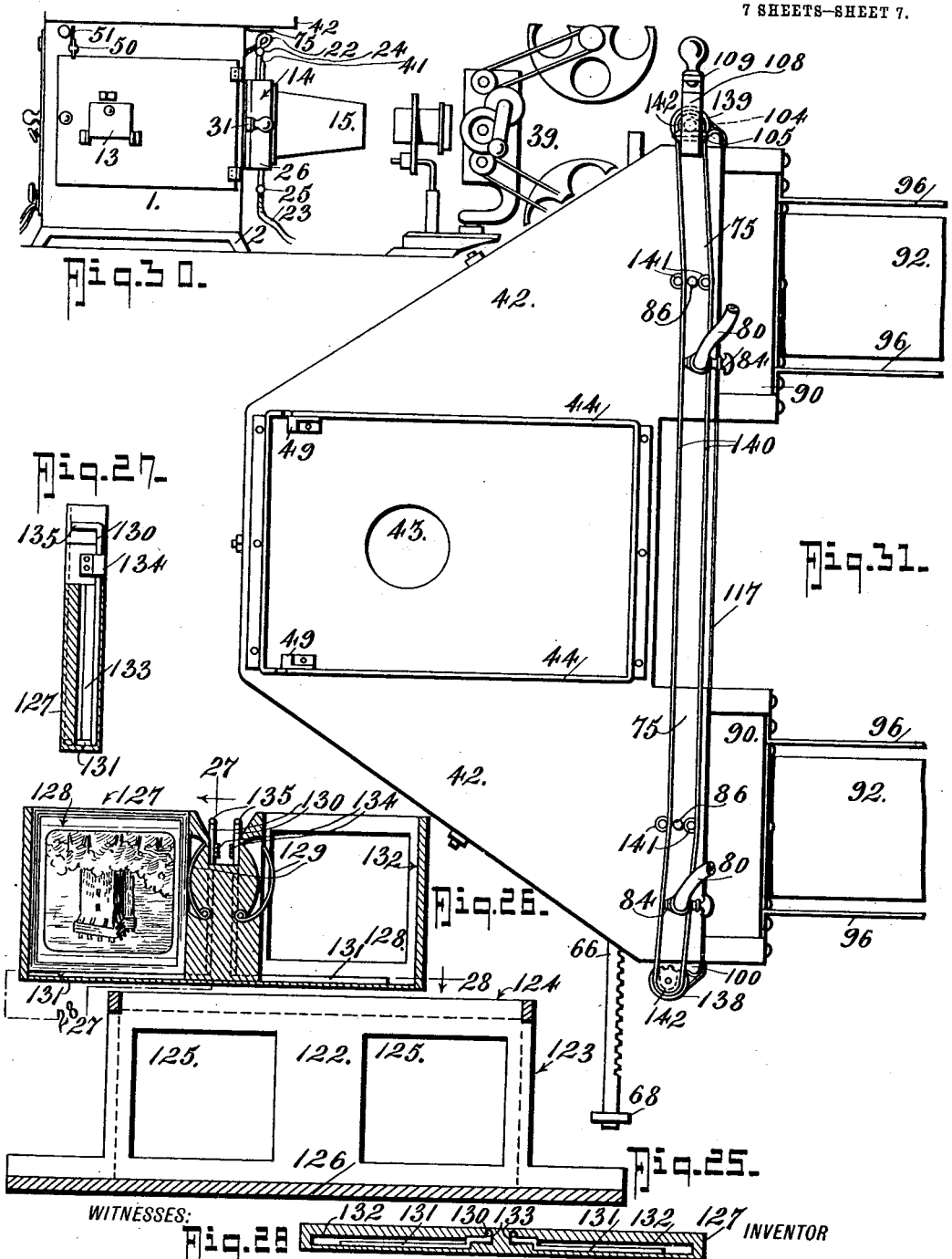

UNITED STATES PATENT OFFICE.

WILLIAM A. CHAPMAN, OF SMITHVILLE, ARKANSAS.

OPTICAL INSTRUMENT.

1,096,284.  Specification of Letters Patent.  Patented May 12, 1914.

Application filed July 31, 1911. Serial No. 641,554.

*To all whom it may concern:*

Be it known that I, WILLIAM A. CHAPMAN, residing in the city of Smithville, county of Lawrence, and State of Arkansas, have invented certain new and useful Improvements in Optical Instruments, of which the following is a specification.

The present invention is an improvement in optical instruments of the class generally known as stereopticon lanterns and moving picture houses, etc., and the invention primarily has for its object to simplify the form of such instruments, reduce their bulk and cost of construction, and broaden the field of the operative use thereof, by rendering possible the exhibition of new and novel effects by the joint action of the stereopticon and moving picture features and a continuous display of pictures.

It is known in the art that in the ordinary lanterns used for stereopticon or moving picture exhibits, breakage of the condenser lenses and breakage of the picture slides, is of frequent occurrence and is a prolific source of annoyance and expense to the operator.

It is, therefore, one of the objects of my invention to overcome these objectionable features in my machine.

It is further known that where stereopticon views are exhibited in conjunction with moving picture films, the apparatus is bulky, expensive and difficult to manage, consisting as it does, of two or three lanterns or lamp houses, each with its independent lamp and always present necessity of shifting the moving picture from its operative position as a prelude to the exhibiting of stereopticon views. Again the stopping, enforced by this act, prevents the dissolving of a moving picture into a still picture, or the reverse, and in exhibiting dissolving pictures, two separate lamps, with attendant light switches, of expensive construction, must be operated, thus requiring skill, so that the admission of the one light and the extinction of the other may be gradual, uniform and accordant.

Therefore, another object of my invention is to avoid the aforesaid objections to optical instruments of the type stated.

It is also known, that at present, there is a period, several times repeated, of five to ten minutes, in which there is no picture shown, to the vexation of the audience.

It is consequently another object of my invention to provide a machine in which a picture may be exhibited to the audience at all times.

It is also well known in the art, that there is a flickering appearance on the screen, that is wearisome, at times painful to the eye, during the showing of moving pictures, and that faces on the screen have a corpse-like look that detracts from the pleasure of viewing them.

My invention, therefore, has for an additional object, the elimination of the flickering and the rendering more life-like of the pictures appearing on the screen.

In the art, as practised today, no method has been devised whereby the general announcements could be displayed upon the screen other than as stereopticon slides, and the exhibit of a panoramic view is not possible with the apparatus in present use.

My invention has for another of its objects to provide a means whereby the general announcement can be displayed upon the screen in a special manner and so that panoramic views may be exhibited when desired.

The invention also has for its object, 1st, to reduce the unwieldiness, weight, and cost of an operator's outfit, and the degree of skill requisite in the operator; 2d, to provide means by which to make projection and exhibit of the various announcements, or a panoramic view printed or painted on a cheap or unbreakable material; 3d, to do away with the necessity of shifting the moving picture machine from its operative position in order to display stereopticon views, and render possible the dissolving of moving pictures into still pictures and vice versa; 4th, to effect, by means of a single lamp and lantern, all that is now accomplished in stereopticon and moving picture machines by two or more separate lights and lanterns; 5th, to prevent the appearance of flicker on the screen when exhibiting moving pictures; 6th, to facilitate manipulation, increase the scope of exhibit powers and render excellence of act less dependent upon the care and skill of the operator; 7th, to produce a self-contained lantern combining all the operative powers of four separate lanterns.

In its generic nature my invention includes an apparatus possessing upper and lower light chamber sections, in the lower one of which the source of illumination is located. The direct rays of light pass through a shutter (when open) to a set of lenses through which they pass to a moving picture machine from which they are projected on to the screen. Light from the source of illumination is reflected by a mirror into the upper light chamber and there distributed from a system of mirrors and reflectors, at the will of the operator, to two distinct stereopticon lens sets or condensers through which the reflected rays pass to, and are focused upon, the screen. All of the foregoing parts are so arranged, that the light rays both direct and reflected, may be controlled by the operator, to allow the moving picture to dissolve into a still picture and vice versa, and to allow one still picture to dissolve into another, and to allow, by an employment of additional parts, the exhibition of a panoramic or continuous moving row of pictures.

In its more subordinate nature the invention also inludes those novel details of construction, combinations and arrangements of parts, all of which will be first fully described and then be specifically pointed out in the appended claims, reference being had to the accompanying drawings in which—

Figure 1, is a perspective view showing the matter of focusing the light beams on the screen. Fig. 2, is a front elevation of the machine, the moving picture mechanism proper being removed. Fig. 3, is a vertical longitudinal section on the line 3—3 of Fig. 2. Fig. 4, is a horizontal section on the line 4—4 of Fig. 3. Fig. 5, is an enlarged front elevation of the right side condenser lenses mechanism. Fig. 6, is a vertical longitudinal section on the line 6—6 of Fig. 5. Fig. 7, is a detail top plan view of a part of the mechanism shown in Fig. 5. Fig. 8, is a detail side elevation of a part of the mechanism shown in Fig. 5. Figs. 9 and 10 are detail views of parts thereof. Fig. 11, is a detail diagrammatic view of a motor mechanism for coöperation with the parts shown in Fig. 5. Fig. 12, is an enlarged detail section and part elevation of the mechanism for raising and lowering the upper light box or chamber. Fig. 13, is a cross section on the line 13—13 of Fig. 12. Fig. 14, is a cross section on the line 14—14 of Fig. 12. Fig. 15, is an outside elevation of the shutter device for controlling the light to the moving picture machine and to the upper light chamber. Fig. 16, is a cross section on the line 16—16 of Fig. 15. Fig. 17, is a front view of one of the condenser lenses. Fig. 18, is a view of the parts forming a lens holding case for the condenser lenses of Fig. 17. Fig. 19, is an enlarged detail section of the safety valve. Fig. 20, is a detail section on the line 20—20 of Fig. 3. Fig. 21, is a detail side elevation of the mirror door. Fig. 22, is a detail diagrammatic section showing the manner of supporting the picture carrying strip. Fig. 23, is an elevation of a part of the picture carrying strip. Fig. 24, is a cross section on the line 24—24 of Fig. 23. Fig. 25, is a central vertical longitudinal section of the double slide carrier. Fig. 26, is a similar view of the double slide holder. Fig. 27, is a cross section on the line 27—27 of Fig. 26. Fig. 28, is a horizontal section on the line 28—28 of Fig. 26. Fig. 29, is an enlarged detail section on the line 29—29 of Fig. 3. Fig. 30, is a detail side elevation showing the relative location of the moving picture machine to the main lantern house or light chamber. Fig. 31, is an inverted plan view of the upper portion of the apparatus showing a modified arrangement. Fig. 32, is a detail view of the fluid reservoir.

In the accompanying drawings like numerals and letters of reference indicate like parts in all of the figures.

My apparatus consists essentially of two principal parts, the lower or moving picture section, and the upper or stereopticon section. The lower section comprises a rectangular housing 1, mounted on a suitable ventilated base 2, having openings 3 in its bottom to allow the cool air to enter beneath the false floor 4. The floor 4 is in the nature of a plate whose outer rim is bent back upon itself at 5 and then downwardly at 7 to form a rest. The floor 4 has air passing openings 6, through the medium of which the air is let in at the sides of the housing 1. The heated air passes out through the top of the housing into the upper light chamber through an opening hereinafter again refered to.

The source of illumination 9 has its standard 8 mounted on the false floor 4 as best indicated in Fig. 3. The source of illumination 9 may be of any approved type, preferably the arc-light type, and as the construction of the same *per se* forms no part of my invention further reference thereto is deemed unnecessary.

Mounted on one side of the housing 1 is a mirror 11 that reflects the center of illumination across the housing, through the window 12 on to the mirror that is carried by the hinged door 13. The front of the housing 1 has an opening controlled by a shutter 27 through which the direct rays of light from the source of illumination 9 are projected and pass through a condenser mechanism 14 into the cone 15, from which they pass through the moving picture machine 39 to the screen 40 indicated in Fig. 1.

The condenser mechanism 14 is of a special construction. The housing 1 carries a tubing 16 in which the condenser lenses and their cases 18 are held and retained by a flanged ring 17. The case 18 carries an inner ring 19 in which gaskets 21 are held and in which gaskets the lenses 20 are mounted so as to leave a chamber between the same, as best indicated in Fig. 3 of the drawings. In order to keep the lenses cool as well as to provide a convenient means for interposing a color screen, I provide a fluid inlet pipe 22 that delivers into the space between the lenses 20 at the bottom so that the said space may be filled with water or other cooling fluid. The fluid is withdrawn from the chamber between the lenses 20, through an outlet pipe 23 that connects with the top of the chamber. The pipes 22 and 23 have stop cocks 24 and 25 respectively, by means of which the flow of fluid may be regulated, a suitable overflow valve 41, best shown in Fig. 19, being provided for safety. Fitted over the pipes 22 and 23 where they encircle the tubes 16 is a casing 26 between which and the front wall of the housing 1 is the rotatable shutter operating ring 28 that controls the movement of the shutters 27.

Referring now particularly to Figs. 3, 15 and 16, it will be observed the shutters 27 are formed of two sections, an upper one and a lower one, to one of which, a rack bar 30 is secured at one side, while a similar rack bar 30 is secured to the other shutter at the other side (see Fig. 15). Both rack bars are designed to continuously mesh with the teeth 29 of the ring 28, which ring is turned through the medium of a lever 31. The respective rack bars are secured to their respective shutter sections by rivets 32 that pass through slots 33 in the front wall of the housing 1. Mounted on the outside of the housing is a pair of vertical guides 34 against which the rack bars 30 rest, and clips 35 are provided to retain the rack bars 30 against the front wall of the housing 1. Mounted within the housing is a pair of vertical guides 36, around which the straps 37, that are secured to the shutters 27, pass. Mounted on the inner side of the shutters 27 is a two-part mirror 38 which is designed to reflect the light from the source 9 into the upper light chamber within the upper housing 42, the reflected rays passing through the opening 43 in the bottom of the upper housing 42.

The upper section 42 of the apparatus is in the nature of a trapezoid section and it is provided with a petticoat 44 that enters the section 1 through the top, the upper section 42 being pivoted at 45 to the lower section 1 so as to be susceptible of being tilted up or down to allow for the proper focusing of the light rays as hereinafter will be more clear. In order to allow for the raising and lowering of the section 42, I provide a shaft 46 which is mounted in bearings 47 in the side of the walls of the lower section 1 near its top, and which is provided with pinions 48 that mesh with racks 49 mounted on the bottom of the upper section 42 of the apparatus. In order that the position of the upper section 42 of the apparatus may be fixed as adjusted, a thumb screw 50 passes through a slot 51 in the side wall of the housing 1 and enters a threaded aperture in the rack bracket 49 (see Figs. 12 to 14 inclusive). The upper trapezoid section 42 of the apparatus has an opening 52 in its top to permit egress of the heated air, a light guard 53 being provided to choke the light that passes through the opening 52. The guard 53 consists of a main plate hinged at 54 to the top of the casing section 42 and a second plate 55 hinged at 56 to the free edge of the main plate, and engaging stops 57 on the top wall of the housing section 42 so that the position of the guard 53 may be adjusted.

Mounted at the front of the upper light chamber in the housing 42 is a V-shaped mirror 58 that coöperates with a swinging reflector 59, mounted adjacent to the rear wall of the upper housing section 42 on a rod 60 that is mounted in bearings 61—62 in the housing 42. The rod 60 has a crank 63 that connects at 64 with the arm 65 of the rack bar 66 that is mounted in bearings 67 and projects through the side walls of the housing 42 and carries a finger piece 68 by means of which the bar 66 may be reciprocated.

The housing 42 has two light openings 69 in its front wall one at each side of the mirror 58. Each of the openings 69 is controlled by swinging shutters 70 that have mirrored surfaces 71 to coöperate with the mirror 58 and reflector 59 so as to transmit the light rays through the openings 69 when the shutters 70 are opened. Each shutter 70 is mounted on a longitudinal axis 72 that is supported in suitable bearings in the casing 42 and carries a pinion 73 to mesh with the rack bar 66, the two shutters 70 being so arranged that when one shutter is closed the other will be completely open and vice versa, and the reflector 59 being so arranged with respect to the shutters that it will direct the light from the reflector 38 to the open shutter, when only one is open and to the mirror 58 when both shutters are opened to the same degree. When both shutters are open to the same extent the reflector 59 is in its mid position, and the rays of light reflected on the mirror 58 will be reflected on to the mirror surfaces 71 of both shutters 70 and pass through both openings 69.

The front of the upper light box or casing section 42 adjacent to each opening 69 is provided with a pair of brackets 74—75 in which the condenser boxes 76 are pivoted at 85 and 86 respectively. The condenser boxes are of substantially the same construction as that of the lower section 1 and include the lenses 77—77 spaced apart to form a water chamber 78 into which water is admitted from an inlet pipe 79 and the water is delivered out through an outlet pipe 80, the pipes 79 and 80 having stop cocks 83 and 84 respectively. The lenses are held in gaskets 82 to effect a fluid tight joint. The upper pivot 85 is secured to the condenser box 76 to turn therewith and it carries an arm 87 which has a thumb screw 88 to engage the rack 89 on the top of the housing, so as to hold the condenser case or box 76 in its adjusted position when turned on its axial line of pivot to focus the beam of light.

90 is an L-shaped bracket member mounted on the front of the case 76 to leave a space 116 to receive the slide carrier 126 hereinafter again referred to. Mounted on the front of the bracket 90 (the bracket being provided with a light aperture) is a tube 91 over which telescopes a second tube 92 that carries the lens members 98 and 99, the tube 92 being telescopically movable on the tube 91 through a rack and pinion device consisting of a rack 93 on the tube 92 and a pinion 94 on the shaft 95, that is mounted in bearings 96 on the front of the bracket 90 and is turned through a finger piece 97.

The condenser case 76 at one side (the right hand side) of the apparatus is provided with laterally projecting brackets 100 in which the shafts 102 of the spools 101 are mounted, the spools being connected together to turn in unison by an endless sprocket chain 136, that passes over sprockets 137 on the shafts 102. Each spool 101 has clips 103 to engage the multiple slide carrier 117 hereinafter again referred to. The outer one of the spool shafts 102 is driven from a shaft 107 through bevel gears 104—105, the shaft 107 being mounted in bearings in a bracket 108, supported beneath the condenser case 76, the shaft 107 being turned through a crank 109 or by any suitable motor 112 belted to the shaft by a belt 113 that passes over the pulley 106 on the shaft 107. In order to insure a continuous turning of the shafts 102 in the same general direction during the operation of the machine, the shaft 107 is provided with a ratchet 110 with which a spring pressed pawl 111 coöperates, as indicated best in Fig. 9 of the drawings.

The multiple picture carrier 117 when in use passes over idler rollers 114 mounted in the brackets 100 adjacent to the spools 101, as best indicated in Figs. 5, 7 and 10 of the drawings.

The overflow pipes 80 from the condenser lenses have safety valves 115 of like construction to those 41 hereinbefore described and shown in detail in Fig. 19.

The multiple picture carrier 117 consists of a band or strip having a set of successively arranged openings 118 separated from one another by bars 119, the bounding walls of the opening 118 being grooved as at 120 to permit the insertion of the picture slides 121 which may be of any approved construction as will be best understood by reference to Figs. 23 and 24 of the drawings.

The double slide carrier, which is best illustrated in Figs. 25 to 28 inclusive, consists essentially of a carrier proper 126 having a pair of openings 125, separated by a wall 122 and having a side entrance 123 and a top entrance 124, through which entrances the slide holder 127 may be admitted. The slide holder is a duplex one of a special construction, and consists of a rectangular body having two exhibiting openings 128 registering with pockets 132 into which the slides are admitted. The slides are held laterally by springs 129 and their vertical adjustment is effected by wires 130 which pass down through slots 133 and then across into the bottom of the pockets 132 as at 131, so that the slides rest on the rod portions 131. The rods 130 have their free ends bent over to form finger grips 135 and are guided in bearings 134.

When it is desired to use the multiple picture carrier 117 in connection with both condenser boxes of the upper section 42 of the apparatus the modified arrangement of Fig. 31 may be employed. In this form one of the spools 138 is mounted at one side and the other 139 is mounted at the other side of the trapezoidal section, the two being connected by an endless sprocket chain 140 that passes over sprockets 142 on the shafts of the spools or rolls 139 and also pass over idlers 141 as indicated.

Operation: It is understood that the machine is equipped with the desired source of illumination 9 and the moving picture machine 39 is in place, the entire apparatus being located the proper distance from the screen in a room prepared for the exhibit of moving and stereopticon pictures. An adjustment of all three beams of light, (see Fig. 1) emanating from the moving picture lens and the stereopticon lenses, is made so that each falls on exactly the same spot on the screen as that occupied by the other. In effecting this adjustment, the moving picture beam of light 143 is first adjusted by manipulation of the means therefor provided and in common use on the moving picture machine, the stereopticon beams 144 and 145 respectively are then brought into horizontal alinement with the light image on the screen, by raising or lowering the back end of the upper housing section 42 through the medium of the adjusting mechanism indicated in detail in Figs. 12 to 14 inclusive, and the section 42 is then secured by tightening the screws 50 so as to maintain the horizontal position of the image formed by the beams of light 144 and 145 on the screen 40. The beams 144 and 145 are then singly made or adjusted to cover the spot on the screen that is covered by the moving picture beam 143. This is accomplished by manipulating the levers 87 that control the lateral movement of the condenser lens cases 76. By moving the levers 87 to the right or left as required, the beams 144 and 145 may be moved to cause their images on the screen 40 to coincide with one another and with that of the beam 143. A clear sharp delineation of the picture is secured by extending or retracting the lens carrying sleeves 92 through the medium of the rack and pinion devices 93 and 94, provided for that purpose. The parts being adjusted as described the views or pictures may be projected. Assuming that a moving picture is to be first shown, the lever 31 that operates the sliding shutters 27, is raised, allowing the light from the source 9 to pass directly through the cone 15 to the moving picture machine 39 and from thence to the screen 40. The operator then manipulates the crank 146 of the moving picture machine in the usual way. While manipulating the crank of the moving picture machine, the operator, has constantly before him, in the mirror on the drop door 13, an image of the carbons and the light craters so that he may make immediate adjustment without stopping his machine. The end of the moving picture exhibit approaching, the operator slowly shifts the shutter operating lever 31 upwardly to close the shutters. As the shutters 27 close, the beam of light from the source 9 (see Fig. 3) is deflected, with increasing intensity, from the reflector 38, on the shutters 27, to the oscillating reflector 59 from whence it is reflected to one or the other of the stereopticon lens openings via the mirror 71 of the shutter 70 of that opening in which a picture slide has been placed. The picture therein grows brighter as the moving picture fades finally replacing it, dissolving the moving picture into a still picture. A reverse movement effects the dissolving of a still picture into a moving picture.

In the exhibit of stereopticon views, a single picture may be shown in the ordinary manner, and this dissolved into another still picture by means of a shifting rod 66 that controls the action of the swinging shutters 70 and the oscillating reflector 59, and incidentally, controls the reflecting functions of the angle mirrors. The shifting of the rod 66 effects a gradually decreasing volume in the body and intensity of the light passing through one lens and a like increase in the other until the light is cut off from the one picture and projected wholly through the other.

In producing moon-light effects, a slide in which is depicted moon, stars and clouds, is placed in the slide for one stereopticon lens, say, the right hand one in Fig. 1, while a desired view is placed in the slide for the other or left hand stereopticon lens in Fig. 1. The swinging shutters 70 are now swung partially open, permitting a portion of the light to pass from the reflector 59 through both lens openings; moon and sunrise or set effects may be thereby secured.

In the exhibit of opaque materials, as minerals, flowers, etc., such are placed in the focus of the oscillating reflector 59.

The first stage of the exhibit ending, the operator sets in motion the motor 112, driving the panoramic or announcement film 117, (it being understood that this film is in position on the right hand stereopticon condenser box, the same having an unobstructed opening in alinement with the beam of light through said condenser box until the time comes for bringing the film in operation) and under cover of this prepares for his next moving picture show.

I have found, that the flickering on the screen is due largely to the change from absolute darkness to intense light, in periods of too great duration, to be covered by persistency of vision. The eye does not receive the impression of darkness, but does partially adapt itself to this extreme, and in this effort of reoccuring adjustment to extremes, is due the sensation of flickering. To prevent the occurrence of this most disagreeable sensation, I direct from one of the stereopticon lenses, or other source, a beam of light, that merely illuminates the screen. On this illuminated screen, the picture is projected from the moving picture machine, being in fact, projected upon a sheet of light, that is interposed between it and the screen. The beam of light, so used, eliminates the extreme darkness, and in reducing the extremes of contrast, the period of change is shortened and under the changed conditions, persistency of vision covers the extremes, and a flickerless image is the result.

In case of the accidental stoppage of the moving picture machine, failure of the fire door to act or other cause, the lever 31 operating the sliding shutters is lowered, thereby closing the shutters and cutting off the light to the moving picture machine forming a most efficient fire guard, instantaneous in action, as the lever is near the hand of the operator, and may be operated without stopping the moving picture machine.

The light condensers of this system have interposed between the lenses a circulating sheet or stream of liquid that is rotative in act, consequent on the fluid in contact with the thin parts of the lenses absorbing heat more rapidly than does that in contact with the thicker portions of the lenses, neither boiling or the forming of a vacuum being possible as the liquid being supplied under pressure, prohibits the one and prevents the other through rapid flow, thus preventing high temperatures and so acting as a preventive of the breaking of condenser lenses, glass slides and the firing of celluloid films.

The stop cocks 83, 84, 24 and 25, admit adjustment of flow, excess being indicated by overflow through the safety valves that also preclude accident should the supply become stopped up. Degree of pressure is controlled by raising or lowering the source of supply 147 (see Fig. 32) which may be of any desired construction. The liquid flowing from its source, enters between the lens glasses at the lowest point, thence it passes upward to the point above the highest opening, and thence down and away.

The corpse-like appearances of the faces of the images is striking, and to correct this defect, colored solutions are used between the lenses to the tinting of the light projection without material change of intensity.

The lens system of this invention, is so disposed, as always, without alteration of relation of parts, to be in operative position for the projection of moving pictures (the reel of the moving picture machine lying between the two light beams projected from the stereopticon lenses (see Fig. 1) the one passing to the right, the other to the left). The stereopticon projective system, is likewise always in operative connection with the moving picture system, and each, also in independent operative adjustment, thus rendering the triad system, self contained, in permanent adjustment, and operatively a unit.

The introduction of an air current from the bottom into the chamber 1, throughout the length of the bottom, and the division of the current into two side currents by means of the false bottom and the openings therein, effects the placement of a sheet of ascending air between the source 9 and the sides of the lantern, and the prevention of the overheating of the sides and bottom. The closure of all direct openings in this manner, also prevents the passage of carbon sparks from the interior of the lantern.

The projection of moving pictures, by this invention, is as commonly done in the art by direct light, but the projection of stereopticon, panoramic and other views and objects is by means of reflected light. To this extent, the system differs from all others now in common use, as it does also, in the means and manner of reflecting the light and how it is controlled, the automatic shifting of light beams, the projection of horizontally moving pictures, and other features that will be clearly apparent to those skilled in the art.

From the foregoing description taken in connection with the accompanying drawings, it is thought that the complete construction, operation and advantages of the invention will be clearly apparent to those skilled in the art to which it appertains, and I desire it understood that changes in the mechanical details of construction and arrangement of parts may be made without departing from the spirit of the invention and the scope of the appended claims.

What I claim is:

1. A lamp housing, means within the same for generating a beam of light, a light chamber, means for reflecting the generated beam into said chamber, said chamber having a plurality of openings, a system of shutters and reflectors in said chamber for respectively cutting off and conveying the reflected beam through said openings as desired.

2. A lamp housing, means within the same for generating a beam of light, a light chamber, means for reflecting the generated beam into said chamber, said chamber having a plurality of outlet openings, a set of reflectors in said chamber for conveying the reflected beam through said openings, and means for cutting off the light that passes through one opening proportionately as it is permitted to pass through the other opening and vice versa.

3. A lamp housing, means within the same for generating light, a light chamber, means for reflecting a beam of light from the light generating means into said chamber, said chamber having a plurality of outlet openings, a set of reflectors in said chamber for conveying the reflected light through said openings, and means cooperative with said reflectors and shutters for dissolving, in whole or in part, the projected image of the beam of light that passes through one opening into the projected image of the beam of light that passes through the other opening and vice versa.

4. In an apparatus of the class described, a relatively fixedly located lamp house, a source of illumination in said lamp house, a relatively fixedly located moving picture machine, means for directly projecting a beam of light from said source to and through said moving picture machine to be projected by said moving picture machine to a predetermined location, a relatively fixedly located stereopticon machine including light beam projectors, means for reflecting light from said source into said stereopticon machine, means in said stereopticon machine for intercepting said reflecting light and distributing it to the stereopticon light beam projectors to be projected thereby, the projected image from said moving picture machine and from said stereopticon projectors being focused to a common location, and means for dissolving the stereopticon views into the moving picture view, and vice versa in whole or in part as desired.

5. In a projecting lantern, a source of illumination, a moving picture machine, means for directly projecting a beam of light from said source to said moving picture machine, a stereopticon machine including light beam projectors, means for reflecting light from said source into said stereopticon machine, means in said stereopticon machine for intercepting said reflected light from said source and distributing it to the stereopticon light beam projectors to be projected thereby, and means coöperative with the aforesaid parts for dissolving the projected image of one of said light beams into the projected image of another of said light beams, in whole or in part.

6. In a projecting lantern, a source of illumination, a moving picture machine, means for directly projecting a beam of light from said source to said moving picture machine, a stereopticon machine including light beam projectors, means for reflecting light from said source into said stereopticon machine, means in said stereopticon machine for intercepting said reflected light from said source and distributing it to the stereopticon light beam projectors to be projected thereby, means coöperative with the aforesaid parts for dissolving the projected image of one of said light beams into the projected image of another of said light beams, in whole or in part, and means for adjusting the position and focus of said projected light beams to cause their projected images on an intercepting screen to coincide.

7. In a projecting lantern, a source of illumination, a moving picture machine, means for directly projecting a beam of light from said source to said moving picture machine, a stereopticon machine including light beam projectors, means for reflecting light from said source into said stereopticon machine, means in said stereopticon machine for intercepting said reflected light from said source and distributing it to the stereopticon light beam projectors to be projected thereby, and means for adjusting the position and focus of said projected light beams to cause their projected images to coincide.

8. In a projecting lantern including a casing, a source of illumination mounted within said casing, means for projecting a plurality of distinct beams of light from the lantern, means for distributing the light from said source to the projecting means, and means coöperative with said distributing means for dissolving one projected beam into another, in whole or in part.

9. In a projecting lantern including a casing, a source of illumination mounted within said casing, means for projecting a plurality of distinct beams of light from the lantern, means for distributing the light from said source to the projecting means, means coöperative with said distributing means for dissolving one projected beam into another, in whole or in part, a moving picture machine into which one of said beams is directed, and stereopticon views interposed in another of said beams.

10. In a projecting apparatus, a projecting lantern including a source of illumination within the lantern, means for simultaneously projecting a plurality of distinct beams of light from the lantern, means for distributing the light from said source to the projecting means, means coöperative with said distributing means for extinguishing anyone or more of said beams of light, partly or wholly, so as to dissolve the projected image of one beam into another in whole or in part, combined with a relatively fixedly located moving picture machine into which one of said beams is directed, stereopticon views interposed in another of said beams, and means for passing a panoramic succession of views through a third one of said beams.

11. A housing having an upper and a lower light chamber, means for generating a beam of light in said lower chamber, a light beam projecting mechanism for projecting the light beam from said lower chamber out of said housing onto an external screen, two distinct light beam projecting devices mounted on the front of said upper chamber to project light beams onto the screen, means for reflecting said light beam within the lower chamber, in whole or in part, into said upper chamber, and means in said upper chamber for distributing said reflected beam to said upper light beam projectors.

12. A housing having an upper and a lower light chamber, means for generating a beam of light in said lower chamber, a light beam projecting mechanism for projecting the light beam from said lower chamber out of said housing onto an external screen, two distinct light beam projecting devices mounted on the front of said upper chamber to project light beams onto the screen, means for reflecting said light beam within the lower chamber, in whole or in part, into said upper chamber, means in said upper chamber for distributing said reflected beam to said upper light beam projectors, proportionately as said light beam within said lower chamber is reflected into said upper chamber to cause the lower externally projected light beam to be transferred in whole, or in part, into the two upper light beams.

13. A housing having an upper and a lower light chamber, means for generating a beam of light in said lower chamber, a light beam projecting mechanism for projecting the light beam from said lower chamber out of said housing onto an external screen, two distinct light beam projecting devices mounted on the front of said upper chamber to project light beams onto the screen, means for reflecting said light beam within the lower chamber, in whole, or in part, into said upper chamber, means in said upper chamber for distributing said reflected beam to said upper light beam projectors proportionately as said light beam within said lower chamber is reflected into said upper chamber to cause the lower externally projected light beam to be transferred in whole, or in part, into the two upper light beams, and means coöperative with said distributing means for dissolving one of the upper projecting light beams into the other at will.

14. A housing having an upper and a lower light chamber, means for generating a beam of light in said lower chamber, a light beam projecting mechanism for projecting the light beam from said lower chamber out of said housing onto an external screen, two distinct light beam projecting devices mounted on the front of said upper chamber to project light beams onto the screen, means for reflecting said light beam within the lower chamber in whole, or in part, into said upper chamber, means in said upper chamber for distributing said reflected beam to said upper light beam projectors, and means coöperative with said distributing means for transferring one of the upper projecting light beams into the other at will.

15. A lamp house, a source of illumination therein, a projecting apparatus mounted on the lamp house, means for transmitting a beam of light from said source into said projecting apparatus, said projecting apparatus including a light chamber, and a plurality of light beam projectors, and means in said light chamber for receiving the transmitted beam of light from the lamp house and transmitting it to said plurality of light beam projectors.

16. A lamp house, a source of illumination therein, a projecting apparatus mounted on the lamp house, means for transmitting a beam of light from said source into said projecting apparatus, said projecting apparatus including a light chamber, and a plurality of light beam projectors, and means in said light chamber for receiving the transmitted beam of light from the lamp house and transmitting it to said plurality of light beam projectors, and means for adjusting the position of said beam projectors so that the respective images of said beams will all coincide.

17. A lamp house, a source of illumination therein, a projecting apparatus mounted on the lamp house, means for transmitting a beam of light from said source into said projecting apparatus, said projecting apparatus including a light chamber, and a plurality of light beam projectors, and means in said light chamber for receiving the transmitted beam of light from the lamp house and transmitting it to said plurality of light beam projectors, and mechanism in said projecting mechanism light chamber for controlling the light transmitted to said beam projectors so that the intensity of illumination of all of said beams may be varied with relation to one another.

18. A lamp house, a source of illumination therein, means for projecting a plurality of beams of light from said house onto an object, means for transmitting light from said source to said beam projecting means, and a set of reflectors and coöperating shutters for controlling the distribution of the light from said source to said beam projecting means so that the projected image of one beam may be dissolved into another, in whole or in part.

19. A lamp house, a source of illumination therein, means for projecting a plurality of beams of light from said house onto an object, means for transmitting light from said source to said beam projecting means, and a set of reflectors and coöperating shutters for controlling the distribution of the light from said source to said beam projecting means so that the projected image of one beam may be dissolved into another, in whole, or in part, together with means for adjusting the position of said beam projecting means so that the respective projected images of said beams on the object will all coincide.

20. A relatively fixedly located moving picture machine, a relatively fixedly located stereopticon, and a relatively fixedly located lamp house common to the same; a source of light in said lamp house, means for conducting a beam of light directly from said source to said moving picture machine, and means for simultaneously conducting a beam of light from said source indirectly to said stereopticon, together with means for focusing all of said beams of light simultaneously to a common focal place.

21. A relatively fixedly located moving picture machine, and a relatively fixedly located stereopticon including a plurality of light beam projectors, combined with a relatively fixedly located common lamp house, a source of light in said lamp house, means for conducting a beam of light directly from said source to said moving picture machine, shutters for intercepting said beam of light, a reflector for reflecting said beam of light into said stereopticon, and means for distributing the beam of light to said stereopticon projectors individually or collectively.

22. A moving picture machine and a stereopticon, combined with a common lamp house relatively fixedly located with relation to said moving picture machine and said stereopticon, a source of light in said lamp house, means for conducting a beam of light directly from said source to said moving picture machine, shutters for intercepting said beam of light, a reflector for reflecting said beam of light into said stereopticon, proportionately as said shutters are closed.

23. A moving picture machine and a stereopticon, combined with a common lamp house relatively fixedly located with relation to said moving picture machine and said stereopticon, a source of light in said lamp house, means for conducting a beam of light directly from said source to said moving picture machine, shutters for intercepting said beam of light, a reflector for reflecting said beam of light into said stereopticon when said shutters are closed.

24. A moving picture machine and a stereopticon combined with a common lamp house relatively fixedly located with relation to said moving picture machine and said stereopticon, a source of illumination in said lamp house, and means for conveying the light from said source to said moving picture machine and to said stereopticon simultaneously.

25. A relatively fixed moving picture machine and a relatively fixed stereopticon combined with a common lamp house, a source of illumination in said lamp house, and means for conducting a beam of light directly to said moving picture machine from said source, together with means for reflecting light from said source into said stereopticon.

26. An optical instrument including a lamp house having a light chamber, a source of illumination in said chamber, said chamber having an opening through which a beam of light may pass directly from said source; a stereopticon light-chamber mounted over said lamp house; and a device for intercepting the beam of light that passes through said first-mentioned chamber opening, and reflecting it in whole, or in part into said stereopticon light-chamber.

27. A moving picture machine, a plurality of stereopticon picture projectors, a lamp house common to both, means for conveying a beam of direct light to the moving picture machine from the lamp house, means for simultaneously conveying reflected light to all of the stereopticon picture projectors.

28. A moving picture machine, a plurality of stereopticon picture projectors, a lamp house common to both, means for conveying a beam of direct light to the moving picture machine from the lamp house, means for conveying reflected light to all of the stereopticon piture projectors, and means for in whole or in part dissolving the projected image of the direct beam into the projected image of the reflected light and vice versa.

29. A moving picture machine including a light chamber and an image projector, a stereopticon picture projector and a panorama picture projecting mechanism, a lamp house common to all of the aforesaid parts, means for conveying a beam of direct light to the moving picture machine from the lamp house, and means for conveying reflected light to the stereopticon picture projector and to the panorama picture projecting mechanism, said moving picture machine, said stereopticon picture projector, and said panorama projecting mechanism all being relatively fixedly located.

30. A moving picture machine including a light condenser and image projector, a stereopticon picture projector and a panorama picture projecting mechanism, a lamp house common to all of the aforesaid parts, means for conveying a beam of direct light to the moving picture machine from the lamp house, means for conveying reflected light to the stereopticon picture projector and to the panorama picture projecting mechanism, and means for dissolving any one of the projected images of the beams of light into any other one of said projected images, said moving picture machine, said stereopticon picture projector, and said panorama projecting mechanism all being relative fixedly located.

31. In an apparatus of the class described, a lamp house, a lower light projecting medium for projecting a beam of light, two upper light projecting mediums horizontally spaced apart for projecting two beams of light above the lower beam of light, a moving picture machine into which the lower beam of light is directed, said moving picture machine being physically located between the two upper beams of light and out of the paths thereof.

32. In an apparatus of the class described, a lamp house, a lower light projecting medium for projecting a beam of light, two upper light projecting mediums horizontally spaced apart for projecting two beams of light above the lower beam of light, a moving picture machine into which the lower beam of light is directed, said moving picture machine being physically located between the two upper beams of light and out of the paths thereof, a single source of illumination for generating the light constituting said beams, and means for dissolving one beam of light into another at will.

33. A lamp housing, means in the same for generating a beam of light, said lamp housing having two outlets through one of which said beam continuously tends to pass, the other outlet being located outside of the fixed line of the beam, combined with a movable reflector for intercepting the beam in whole or in part, to cut off its passage through the direct light opening and reflect it proportionately through the other opening, a screen onto which the light from said direct light opening is projected, a stereopticon machine for projecting light onto said screen, said stereopticon machine including a light chamber in communication with said lamp house via said other opening, and means in said light chamber for receiving and manipulating the reflected light from said lamp house to perform the light function of the stereopticon.

34. In an apparatus of the character stated, a lamp house having a direct light outlet opening and a reflected light outlet opening, a light generator in said house and including means continuously tending to project a beam of light through said direct light outlet opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is opened, and light condensing and focusing mechanisms at each outlet opening for projecting the light that passes through said outlet openings in the same general direction.

35. In an apparatus of the character stated, a lamp house having a direct light outlet opening and a reflected light outlet opening, a light generator in said house and including means continuously tending to project a beam of light through said direct light outlet opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is open, light condensing and focusing mechanisms at each outlet opening for projecting the light that passes through said outlet opening in the same general direction, and means coöperative with said condensing and focusing mechanisms for projecting images through the focused light beams.

36. In an apparatus of the character stated, a lamp house having a direct light outlet opening and a reflected light outlet opening, a light generator in said house and including means continuously tending to project a beam of light through said direct light outlet opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is open, light condensing and focusing mechanisms at each outlet opening for projecting the light that passes through said outlet openings in the same general direction, and means for adjusting said condensing and focusing mechanisms to focus the respective beams of light at a common place on the screen.

37. In an apparatus of the character stated, a lamp house having a direct light outlet opening and a reflected light outlet opening, a light generator in said house and including means continuously tending to project a beam of light through said direct light opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is open, light condensing and focusing mechanisms at each outlet opening for projecting the light that passes through said outlet openings in the same general direction, means coöperative with said condensing and focusing mechanisms for projecting images through the focused light beams, and means for adjusting said condensing and focusing mechanisms to focus the respective beams of light at a common place on the screen.

38. In an apparatus of the character stated, a lamp house having a direct light outlet opening and a reflected light outlet opening, a light generator in said house and including means continuously tending to project a beam of light through said direct light outlet opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is opened light condensing and focusing mechanisms at each outlet opening for projecting the light that passes through said outlet openings in the same general direction, said condensing and focusing mechanisms each including condenser cases, and condenser lenses in said cases, and means operating directly on said lenses for cooling the same.

39. In an apparatus of the character stated, a lamp house having a direct light outlet opening and a reflected light outlet opening, a light generator in said house and including means continuously tending to project a beam of light through said direct light outlet opening, movable shutters for closing said direct light outlet opening, reflectors carried by said shutters for intercepting the light beam and reflecting it through said reflected light opening as said shutters close, a second chamber into which the reflected light is passed, said second chamber having a pair of outlet openings, shutters for controlling said last named outlet openings, means for reflecting the light received in said second chamber through its outlet openings, which means consists of a rotary reflector that receives the reflected light beam from the lamp house and reflectors on said second chamber outlet shutters to receive the reflected beam from said rotary reflector and pass it through the respective outlet opening when its shutter is opened, light condensing and focusing mechanisms at each outlet opening for projecting the light that passes through said outlet openings in the same general direction, said condensing and focusing mechanisms each including condenser cases, and condenser lenses in said cases, means operating directly on said lenses for cooling the same, and simultaneously color-tinting the light that passes through the lenses.

40. In a machine of the character stated, a lamp house, a light beam generator in said lamp house, said lamp house having a direct light outlet opening through which said light beam tends to pass, a shutter for controlling said opening, a condenser mechanism mounted on said lamp house over said opening, a moving picture machine mounted in operative relation to said condenser mechanism so that the beam of light passing through said condenser mechanism will pass through said moving picture machine and be projected thereby onto an intercepting screen, a stereopticon mechanism mounted on said lamp house and having two light outlet openings, light condensing and projecting mechanisms mounted adjacent to said last named outlet openings to each project a beam of light onto the screen, means for vertically adjusting said stereopticon mechanism to bring the images on the screen, of its projected beams of light in horizontal alinement with that of the moving picture machine, means for laterally adjusting said condensing and projecting mechanisms of said stereopticon to cause their respective images to coincide on the screen, and means for reflecting, in whole or in part, the beam of light from the lamp house into the stereopticon, and means in the stereopticon for distributing such light to the respective outlet openings of the same.

41. In a machine of the character stated, a lamp house, a light beam generater in said lamp house, said lamp house having a direct light outlet opening through which said light beam tends to pass, a shutter for controlling the said opening, a condenser mechanism mounted on said lamp house over said opening, a moving picture machine mounted in operative relation to said condenser mechanism so that the beam of light passing through said condenser mechanism will pass through said moving picture machine and be projected onto an intercepting screen, a stereopticon mechanism mounted on said lamp house and having two light outlet openings, light condensing and projecting mechanisms mounted adjacent to said last named outlet openings to each project a beam of light onto the screen, means for vertically adjusting said stereopticon mechanism to bring the images on the screen of its projected beams of light in horizontal alinement with that of the moving picture machine, means for laterally adjusting said condensing and projecting mechanisms of said stereopticon to cause their respective images to coincide on the screen, means for reflecting, in whole or in part, the beam of light from the lamp house into the stereopticon, means in the stereopticon for distributing such light to the respective outlet openings of the same, and means for dissolving the image of any one of the beams projected onto the screen into the image of any other one of the said beams at the will of the operator.

42. In a machine of the character stated, a lamp house, a light beam generator in said lamp house, said lamp house having a direct light outlet opening through which said light beam tends to pass, a shutter for controlling said opening, a condenser mechanism mounted on said lamp house over said opening, a moving picture machine mounted in operative relation to said condenser mechanism so that the beam of light passing through said condenser mechanism will pass through said moving picture machine and be projected thereby onto an intercepting screen, a stereopticon mechanism mounted on said lamp house and having two light outlet openings, light condensing and projecting mechanisms mounted adjacent to said last named outlet openings to each project a beam of light onto the screen, means for vertically adjusting said stereopticon mechanism to bring the images on the screen of its projected beams of light in horizontal alinement with that of the moving picture machine, means for laterally adjusting said condensing and projecting mechanism of said stereopticon to cause their respective images to coincide on the screen, means for reflecting, in whole or in part, the beam of light from the lamp house into the stereopticon, means in the stereopticon for distributing such light to the respective outlet openings of the same, one of said stereopticon condensing and projecting mechanisms including a slide receiving portion, still picture slides operating in the same, the other of said stereopticon condensing and projecting mechanism including continuous panoramic strip-carrying mechanism, and means for moving the strip longitudinally to exhibit a succession of panoramic pictures.

43. In a machine of the character stated, a lamp house, a light beam generator in said lamp house, said lamp house having a direct light outlet opening through which said light beam tends to pass, a shutter for controlling said opening, a condenser mechanism mounted on said lamp house over said opening, a moving picture machine mounted in operative relation to said condenser mechanism so that the beam of light passing through said condenser mechanism will pass through said moving picture machine and be projected thereby onto an intercepting screen, a stereopticon mechanism mounted on said lamp house, and having two light outlet openings, light condensing and projecting mechanisms mounted adjacent to said last named outlet openings to each project a beam of light onto the screen, means for vertically adjusting said stereopticon mechanism to bring the images on the screen of its projected beam of light in horizontal alinement with that of the moving picture machine, means for laterally adjusting said condensing and projecting mechanism of said stereopticon to cause their respective images to coincide on the screen, means for reflecting, in whole or in part, the beam of light from the lamp house into the stereopticon, means in the stereopticon for distributing such light to the respective outlet openings of the same, one of said stereopticon condensing and projecting mechanisms including a slide receiving portion, still picture slides operating in the same, the other of said stereopticon condensing and projecting mechanisms including continuous panoramic-strip-carrying mechanism, means for moving the strip longitudinally to exhibit a succession of panoramic pictures, and means for dissolving the image of any one of the projected beams from the projecting mechanisms into the image of any other one, in whole or in part, at the will of the operator.

44. In a machine of the character stated, a lamp house, a light beam generator in said lamp house, said lamp house having a direct light outlet opening through which said light beam tends to pass, a shutter for controlling the said opening, a condenser mechanism mounted on said lamp house over said opening, a moving picture machine mounted in operative relation to said condenser mechanism so that the beam of light passing through said condenser mechanism will pass through said moving picture machine and be projected onto an intercepting screen, a stereopticon mechanism mounted on said lamp house and having two light outlet openings, light condensing and projecting mechanisms mounted adjacent to said last named outlet openings to project a beam of light onto the screen, means for vertically adjusting said stereopticon mechanism to bring the images, on the screen, of its projected beam of light in horizontal alinement with that of the moving picture machine, means for laterally adjusting said condensing and projecting mechanism of said stereopticon to cause the respective images to coincide on the screen, means for reflecting, in whole or in part, the beam of light from the lamp house into the stereopticon, means in the stereopticon for distributing such light to the respective outlet openings of the same, means for dissolving the image of any one of the beams projected onto the screen into the image of any other one of the said beams at the will of the operator, said condensing and projecting mechanisms each including a pair of condensing lenses spaced apart to leave a chamber between them, and means for passing a cooling fluid between the lenses.

45. In a machine of the character stated, a lamp house, a light beam generator in said lamp house, said lamp house having a direct light outlet opening through which said light beam tends to pass, a shutter for controlling said opening, a condenser mechanism mounted on said lamp house over said opening, a moving picture machine mounted in operative relation to said condenser mechanism so that the beam of light passing through said condenser mechanism will pass through said moving picture machine and be projected thereby onto an intercepting screen, a stereopticon mechanism mounted on said lamp house, and having two light outlet openings, light condensing and projecting mechanisms mounted adjacent to said last named outlet openings to each project a beam of light onto the screen, means for vertically adjusting said stereopticon mechanism to bring the images on the screen of its projected beam of light in horizontal alinement with that of the moving picture machine, means for laterally adjusting said condensing and projecting mechanism of said stereopticon to cause their respective images to coincide on the screen, means for reflecting, in whole or in part, the beam of light from the lamp house into the stereopticon, means in the stereopticon for distributing such light to the respective outlet openings of the same, one of said stereopticon condensing and projecting mechanisms including a slide receiving portion, still picture slides operating in the same, the other of said stereopticon condensing and projecting mechanisms including continuous panoramic-strip-carrying mechanism, means for moving the strip longitudinally to exhibit a succession of panoramic pictures, means for dissolving the image of any one of the projected beams from the projecting mechanisms into the image of any other one in whole or in part, at the will of the operator, said condensing and projecting mechanism each including a pair of condensing lenses spaced apart to leave a chamber between them, and means for passing a cooling fluid between the lenses.

46. In a machine of the character stated, a lamp house, a light beam generator in said lamp house, said lamp house having a direct light outlet opening through which said light beam tends to pass, a shutter for controlling the said opening, a condenser mechanism mounted on said lamp house over said opening, a moving picture machine mounted in operative relation to said condenser mechanism so that the beam of light passing through said condenser mechanism will pass through said moving picture machine and be projected onto an intercepting screen, a stereopticon mechanism mounted on said lamp house and having two light outlet openings, light condensing and projecting mechanisms mounted adjacent to said last named outlet openings to each project a beam of light onto the screen, means for vertically adjusting said stereopticon mechanism to bring the images on the screen of its projected beams of light in horizontal alinement with that of the moving picture machine, means for laterally adjusting said condensing and projecting mechanisms of said stereopticon to cause their respective images to coincide on the screen, means for reflecting, in whole or in part, the beam of light from the lamp house into the stereopticon, means in the stereopticon for distributing such light to the respective outlet openings of the same, means for dissolving the image of any one of the beams projected onto the screen into the image of any other one of the said beams at the will of the operator, and means coöperative with the condensing and projecting mechanisms for color-tinting the projected beams of light and simultaneously cooling the condenser lenses.

47. In an optical instrument, a lamp house having a direct light outlet opening, a light beam generator in said lamp house for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, and a light condensing and projecting mechanism mounted over the outside of said opening.

48. In an optical instrument, a lamp house having a direct light outlet opening, a light beam generator in said lamp house for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, and a light condensing and projecting mechanism mounted over the outside of said opening, said light condensing and projecting mechanism including a light condenser case, and a pair of condenser lenses mounted in the same and spaced apart, and means operative between the lenses for cooling the same, to prevent undue heat passing through the same into the projected beam of light.

49. In an optical apparatus, a lamp house having a direct light outlet opening, a light beam generator in said lamp house for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, a light condensing and projecting mechanism mounted over the outside of said opening, said lamp house having a screen opening, and means mounted on said shutters for intercepting the light beam as such shutters are closed to proportionately reflect it through said screen opening.

50. In an optical instrument, a lamp house having a direct light outlet opening, a light beam generator in said lamp house, for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, a light condensing and projecting mechanism mounted over the outside of said opening, said lamp house having a screen opening, and means mounted on said shutters for intercepting the light beam as said shutters are closed to proportionately reflect it through said screen opening, a screen chamber mounted on said lamp house over said screen opening into which said reflected beam of light is projected, a reflector in said second chamber for receiving the reflected beam of light, said second chamber having two outlet openings, one at each side, mirrored shutters pivotally mounted adjacent to said outlet openings, one for each opening, an operator controlled device connecting said pivoted shutters with said second chamber reflector to coöperatively move the same to distribute the light in said second chamber at the will of the operator to one or both of said second chamber outlets.

51. In an optical instrument, a lamp house having a direct light outlet opening, a light beam generator in said lamp house for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, a light condensing and projecting mechanism mounted over the outside of said opening, said lamp house having a screen opening, and means mounted on said shutters for intercepting the light beam as said shutters are closed to proportionately reflect it through said screen opening, a second chamber mounted on said lamp house over said screen opening into which said reflected beam of light is projected, a reflector in said second chamber for receiving the reflected beam of light, said second chamber having two outlet openings, one at each side, mirrored shutters pivotally mounted adjacent to said outlet openings, one for each opening, an operator controlled device connecting said pivoted shutters with said second chamber reflector to coöperatively move the same to distribute the light in said second chamber at the will of the operator to one or both of said second chamber outlets, and light condensing and projecting mechanisms mounted on said second chamber over the respective outlets of the same for projecting beams of light in the same general direction as that passing through the first mentioned outlet opening of said lamp house.

52. In an optical instrument, a lamp house having a direct light outlet opening, a light beam generator in said lamp house, for continuously tending to project a beam of light through said opening, sliding shutters controlling a beam of light through said opening, said sliding shutters including two sections, rack bars secured to said sections, a rotatable gear ring meshing with said rack bars, means for rotating said ring to open and close said shutters, a light condensing and projecting mechanism mounted over the outside of said opening, said lamp house having a screen opening, and means mounted on said shutters for intercepting the light beam as said shutters are closed to proportionately reflect it through said screen opening, a second chamber mounted on said lamp house over said screen opening into which said reflected beam of light is projected, a reflector in said second chamber for receiving the reflected beam of light, said second chamber having two outlet openings, one at each side, mirrored shutters pivotally mounted adjacent to said outlet openings, one for each opening, an operator controlled device connecting said pivoted shutters with said second chamber reflector to coöperatively move the same to distribute the light in said second chamber at the will of the operator to one or both of said second chamber outlets, light condensing and projecting mechanisms mounted on said second chamber over the respective outlets of the same for projecting beams of light in the same general direction as that passing through the first mentioned outlet opening of said lamp house, a moving picture machine for receiving the light projected through said lamp house direct light outlet opening, means for interposing image bearing slides in the light beams that pass through said second chamber condensing and projecting mechanisms.

53. In an optical instrument, a lamp house having a direct light outlet opening, a light beam generator in said lamp house for continuously tending to project a beam of light through said opening, sliding shutters controlling the passage of light through said opening, said sliding shutters including two sections, rack bars secured to said sections, a rotatable gear ring meshing with said rack bars, means for rotating said ring to open and close said shutters, a light condensing and projecting mechanism mounted over the outside of said opening, said lamp house having a screen opening, means mounted on said shutters for intercepting the light beam as said shutters are closed to proportionately reflect it through said screen opening, a second chamber mounted on said lamp house over said screen opening into which said reflected beam of light is projected, a reflector in said second chamber for receiving the reflected beam of light, said second chamber having two outlet openings, one at each side, mirrored shutters pivotally mounted adjacent to said outlet openings, one for each opening, an operator controlled device connecting said pivoted shutters with said second chamber reflector to coöperatively move the same to distribute the light in said second chamber at the will of the operator to one or both of said second chamber outlets, light condensing and projecting mechanisms mounted on said second chamber over the respective outlets of the same for projecting beams of light in the same general direction as that passing through the first mentioned outlet opening of said lamp house, a moving picture machine for receiving the light projected through said lamp house direct light outlet opening, means for intercepting image bearing slides in the light beams that pass through said second chamber condensing and projecting mechanisms, a screen onto which the projected beams and images from all of said condensing and projecting mechanisms and the moving picture machine are projected, and means for angularly adjusting the second chamber condensing and projecting mechanisms to cause their images to coincide with one another and with that of the beam of light from the moving picture machine on the screen.

54. In an optical instrument, a lamp house, a light generator in said lamp house, an upper light chamber mounted above said lamp house, two distinct light projecting devices carried by said upper light chamber and including condensers, means for focusing the beam from said condensers to a common place, said lamp house having a direct light opening, means for focusing the light that passes through said direct opening to a given place, means for adjusting the focus of the upper light chamber beams to the same place, said lamp house and said upper light chamber having a communicating opening, means for intercepting the direct beam of light and reflecting it into the upper light chamber proportionately as the direct beam is intercepted, and means in said upper light chamber for distributing the reflected beam to the upper light projectors, and means forming a coöperative part of said distributing means for regulating the distribution in a manner so that all of the reflected light can be passed through one or the other of the upper beam projectors as desired, all being arranged whereby three distinct light beams may be simultaneously projected to the common image place, and whereby one or more of said beams may be extinguished in whole or in part, and the remaining beams correspondingly increased in intensity.

55. An optical instrument, a casing inclosing an upper and a lower chamber, an opening between said chambers, said lower chamber having a light outlet, and said upper chamber having a plurality of light outlets, a light beam generator mounted in the lower chamber to directly project a light beam through the light opening of said lower chamber, a combined shutter and reflector device in said lower chamber for cutting off the beam of light projected through the light opening of said lower chamber and simultaneously reflecting the same into the upper chamber, means in said upper chamber for distributing the reflected beam of light to the light openings of said upper chamber, condensers coöperating with the several light openings, and means for focusing the beams that pass through the several openings to a common place, and means for interposing transparencies in the several projected beams.

56. In an optical instrument, a casing inclosing an upper and a lower chamber, a light generator in said lower chamber, said lower chamber having a light opening, said light generator including means for projecting a beam of light through said opening to the exterior of the casing, said casing having two distinct light openings for the upper chamber, means in said lower chamber for closing said lower chamber light opening and simultaneously reflecting the beam of light into said upper chamber proportionately as said lower chamber light opening is closed, and means in said upper chamber for intercepting the reflected beam and distributing it to the light openings of the upper chamber, and means for focusing the light beams that pass through the light openings of the upper chamber to the same focal place for which the light beam that passes through the lower chamber opening is focused.

57. In an optical instrument, a casing inclosing an upper and a lower chamber, a light generator in said lower chamber, said lower chamber having a light opening, said light generator including means for projecting a beam of light through said opening to the exterior of the casing, said casing having two distinct light openings for the upper chamber, means in said lower chamber for closing said lower chamber light opening and simultaneously reflecting the beam of light into said upper chamber proportionately as said lower chamber light opening is closed, and means in said upper chamber for intercepting the reflected beam and distributing it to the light openings of the upper chamber, and means for focusing the light beams that pass through the light openings of the upper chamber to the same focal place for which the light beam that passes through the lower chamber opening is focused, and means forming a coöperative part of said upper chamber light beam intercepting and distributing means for dissolving the image of one of the light beams that pass from the upper chamber into the image of the other of said light beams in whole or in part.

58. In an optical instrument, a casing inclosing an upper and a lower chamber, a light generator in said lower chamber, said lower chamber having a light opening, said light generator including means for projecting a beam of light through said opening to the exterior of the casing, said casing having two distinct light openings for the upper chamber, means in said lower chamber for closing said lower chamber light opening and simultaneously reflecting the beam of light into said upper chamber proportionately as said lower chamber light opening is closed, and means in said upper chamber for intercepting the reflected beam and distributing it to the light openings of the upper chamber, and means for focusing the light beams that pass through the light openings of the upper chamber to the same focal place for which the light beam that passes through the lower chamber opening is focused, and means forming a coöperative part of said upper chamber light beam intercepting and distributing means for dissolving the image of one of the light beams that pass from the upper chamber into the image of the other of said light beams in whole or in part, and transparencies held in coöperative relation to the several light beams, all being arranged whereby the images of all transparencies may be gathered at the focal place simultaneously or individually as desired.

59. In an optical instrument, the combination with a relatively fixedly located moving picture machine and a relatively fixedly located stereopticon of a relatively fixedly located common lamp house for simultaneously furnishing the illumination for both the stereopticon machine and the moving picture machine, and means for focusing both the moving picture image and the stereopticon image at a common place for simultaneous exposition.

WILLIAM A. CHAPMAN.

Witnesses:
J. E. MOORE,
S. R. HILLHOUSE.

Copies of this patent may be obtained for five cents each, by addressing the "Commissioner of Patents, Washington, D. C."